(12) United States Patent
Buchan et al.

(10) Patent No.: US 9,322,242 B2
(45) Date of Patent: Apr. 26, 2016

(54) BALL VALVE ASSEMBLY

(75) Inventors: Robert Buchan, Aberdeen (GB);
Sivakumar Natarajan, Bangalore (IN);
Vikram Tutpet Keshavamurthy,
Bangalore (IN); Thirupathi Dommati,
Bangalore (IN)

(73) Assignee: Vetco Gray Inc., Houston, TX (US)

( * ) Notice: Subject to any disclaimer, the term of this patent is extended or adjusted under 35 U.S.C. 154(b) by 307 days.

(21) Appl. No.: 13/605,054

(22) Filed: Sep. 6, 2012

(65) Prior Publication Data

US 2014/0000903 A1 Jan. 2, 2014

(30) Foreign Application Priority Data

Sep. 6, 2011 (EP) ..................................... 11180156

(51) Int. Cl.
*E21B 34/06* (2006.01)
*E21B 34/10* (2006.01)
*F16K 31/163* (2006.01)
*E21B 34/00* (2006.01)

(52) U.S. Cl.
CPC ................. *E21B 34/06* (2013.01); *E21B 34/10* (2013.01); *F16K 31/1635* (2013.01); *E21B 2034/002* (2013.01)

(58) Field of Classification Search
CPC ........... F16K 1/14; F16K 5/06; F16K 5/0647; F16K 5/0652; F16K 31/122; F16K 31/1223; F16K 31/1225; F16K 31/36; F16K 31/363; E21B 2034/002; E21B 34/12
USPC .............. 251/31, 63, 315.01, 315.08, 315.09; 166/332.3, 334.2, 335–368
See application file for complete search history.

(56) References Cited

U.S. PATENT DOCUMENTS 3,107,080 A * 10/1963 Priese .............................. 251/31
4,034,958 A * 7/1977 Masclet ........................... 251/28
(Continued)

FOREIGN PATENT DOCUMENTS

CN 101037929 A 9/2007
GB 2340860 3/2000
(Continued)

OTHER PUBLICATIONS

Partial Search Report and Written Opinion from corresponding European Application No. 11180156.9, Dated Jan. 24, 2012.
(Continued)

*Primary Examiner* — John K Fristoe, Jr.
*Assistant Examiner* — Daniel P Donegan
(74) *Attorney, Agent, or Firm* — GE Global Patent Operation

(57) ABSTRACT

A ball valve assembly is provided. The ball valve assembly comprises a pipe section having an axial bore for enabling fluid flow therethrough in use; a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore; a device configured to rotate the valve ball, the device being located radially outside the axial bore; and an encapsulation positioned to receive the valve ball and having portions located radially between the pipe bore and the device configured to rotate the valve ball, such that the encapsulation prevents fluid within the axial bore from accessing the device configured to rotate the valve ball.

17 Claims, 5 Drawing Sheets

(56) References Cited

U.S. PATENT DOCUMENTS

| | | | | |
|---|---|---|---|---|
| 4,476,933 A * | 10/1984 | Brooks | ............ | 166/324 |
| 4,494,609 A * | 1/1985 | Schwendemann | ............ | 166/336 |
| 4,537,383 A * | 8/1985 | Fredd | ............ | 251/58 |
| 4,576,234 A * | 3/1986 | Upchurch | ............ | 166/319 |
| 4,619,325 A * | 10/1986 | Zunkel | ............ | 166/374 |
| 4,903,775 A * | 2/1990 | Manke | ............ | 166/373 |
| 5,338,001 A * | 8/1994 | Godfrey et al. | ............ | 251/58 |
| 5,551,665 A * | 9/1996 | Noack et al. | ............ | 251/58 |
| 5,806,563 A * | 9/1998 | Rabby | ............ | 137/613 |
| 5,865,246 A | 2/1999 | Brown | | |
| 6,152,229 A | 11/2000 | Jennings | | |
| 6,698,712 B2 | 3/2004 | Milberger et al. | | |
| 7,140,949 B2 | 11/2006 | Gatton et al. | | |
| 7,806,176 B2 * | 10/2010 | Moody, V | ............ | 166/77.51 |
| 7,963,339 B2 * | 6/2011 | Cowie et al. | ............ | 166/373 |
| 8,151,887 B2 | 4/2012 | DCosta et al. | | |
| 8,708,307 B2 * | 4/2014 | Inglis | ............ | 251/315.08 |
| 8,752,653 B2 * | 6/2014 | Seneviratne et al. | ............ | 175/218 |
| 2002/0029890 A1 * | 3/2002 | Patel | ............ | 166/386 |
| 2002/0046842 A1 * | 4/2002 | Kent | ............ | 166/368 |
| 2003/0024705 A1 * | 2/2003 | Whitby | ............ | E21B 33/064 166/363 |
| 2008/0110632 A1 * | 5/2008 | Beall | ............ | 166/332.3 |
| 2009/0065213 A1 | 3/2009 | Burnett | | |
| 2010/0276153 A1 * | 11/2010 | Gette et al. | ............ | 166/351 |
| 2010/0314120 A1 * | 12/2010 | Plunkett et al. | ............ | 166/319 |

FOREIGN PATENT DOCUMENTS

| | | |
|---|---|---|
| WO | 00/15943 | 3/2000 |
| WO | 01/42695 | 6/2001 |
| WO | 2006/040592 | 4/2006 |
| WO | 2008/060891 | 5/2008 |

OTHER PUBLICATIONS

Extended Search Report and Written Opinion from corresponding European Application No. 11180156.9, dated May 21, 2012.
Unofficial English translation of Chinese Office Action issued in connection with corresponding CN Application No. 201210326811.1 on Oct. 29, 2015.

* cited by examiner

BALL VALVE ASSEMBLY

BACKGROUND OF THE INVENTION

Embodiments of the present invention relate to a ball valve assembly, and more particularly, a ball valve assembly for use in underwater (such as subsea) well completions.

Ball valves are mechanical devices used to control fluid flow. They comprise a generally spherical or part-spherical rotatable valve element ("ball") with a bore therethrough, positioned within a fluid conduit. In a first, open, configuration, the bore of the ball, is substantially in line with the conduit, such that fluid may flow therethrough. As the ball is rotated., the available fluid flow path is constricted or sheared until the ball reaches a closed configuration, in which the ball's bore is not accessible to the fluid in the conduit, and so no fluid flow is possible past the ball. To enable controlled rotation of the ball, it is typically mounted on bearings and/or provided with trunnions for supporting accommodation within a support assembly.

One major application of ball valves is within underwater hydrocarbon extraction or production facilities, and in such locations may be used to control the flow of production fluid. As prior art may be noted U.S. Pat. No. 6,152,229, WO2006/040592, U.S. Pat. No. 6,698,712, US2009/0065212, US2009/0065213, WO2008/060891 and GB 2340860 for example.

When used in this way, the ball valve is operating within a harsh environment. In particular, the fluid may contain significant amounts of debris or particulate contaminants. With prior art designs such as those set out above, it is a problem that such debris may contaminate the ball valve support/actuation assembly (known as the actuation zone), preventing effective rotation of the ball. It is common for ball valves to stall before their intended life-cycle end due to debris ingress, contamination formation, corrosion, and lubrication washout. This stalling may lead to over-stressing and deformation of the rotation mechanism, rendering the valve inoperable.

In addition, ball valve assemblies may become unbalanced, so that an opening or dosing force is not applied evenly to the ball. This lack of balance may also cause over-stressing and deformation of the rotation mechanism.

It is also important to provide a failsafe mechanism, which acts to close the valve in the event of planned or unplanned venting of valve control system pressure.

Embodiments of the present invention overcome the problems described above, and thus provide a ball valve assembly suitable for use in harsh environments, such as within a well completion system.

BRIEF DESCRIPTION OF THE INVENTION

In accordance with an aspect of the present invention, a ball valve assembly is provided. The ball valve assembly comprises: a pipe section having an axial bore for enabling fluid flow therethrough in use a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore; a device configured to rotate the valve ball, the device being located radially outside the axial bore; and an encapsulation, positioned to receive the valve ball and having portions located radially between the pipe bore and the device configured to rotate the valve ball, such that the encapsulation prevents fluid within the axial bore from accessing the device configured to rotate the valve ball.

In accordance with an aspect of the present invention, a ball valve assembly is provided. The ball valve assembly comprises: a pipe section having an axial bore for enabling fluid flow therethrough in use; a valve ball having an internal conduit, the valve ball being mounted within the pipe section and for rotation with respect to the pipe section between an open position in which fluid within the axial bore may flow through the internal conduit and a closed position in which the internal conduit is inaccessible to fluid within the axial bore; and a device configured to rotate the valve ball, the device being located radially outside the bore. The device configured to rotate the valve ball comprises a first piston and a second piston located on opposed sides of the valve ball in the direction of the bore axis, the first piston and second piston being configured to be actuated by a common hydraulic fluid line, such that application of hydraulic fluid pressure at the common hydraulic fluid line causes the first piston and second piston to be subjected to linear actuating forces of substantially equal magnitude in opposite directions.

In accordance with another aspect of the present invention, a ball valve assembly is provided. The ball valve assembly comprises a pipe section having an axial bore for enabling fluid flow therethrough in use; a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore; a device configured to rotate the valve ball, the device being located radially outside the bore; and an encapsulation. The encapsulation is positioned to receive the valve ball and has portions located radially between the pipe bore and the device configured to rotate the valve ball, such that the encapsulation prevents fluid within the axial bore from accessing the device configured to rotate the valve ball. The device configured to rotate the valve ball comprises a first piston and a second piston located on opposed sides of the valve ball in the direction of the bore axis, the first piston and second piston being configured to be actuated by a common hydraulic fluid line, such that application of hydraulic fluid pressure at the common hydraulic fluid line causes the first piston and the second piston to be subjected to linear actuating forces of substantially equal magnitude in opposite directions.

BRIEF DESCRIPTION OF THE DRAWINGS

Embodiments of the present invention will now be described with reference to the accompanying drawings, in which.

DETAILED DESCRIPTION OF THE EXEMPLARY EMBODIMENTS OF THE INVENTION

Figure 1:
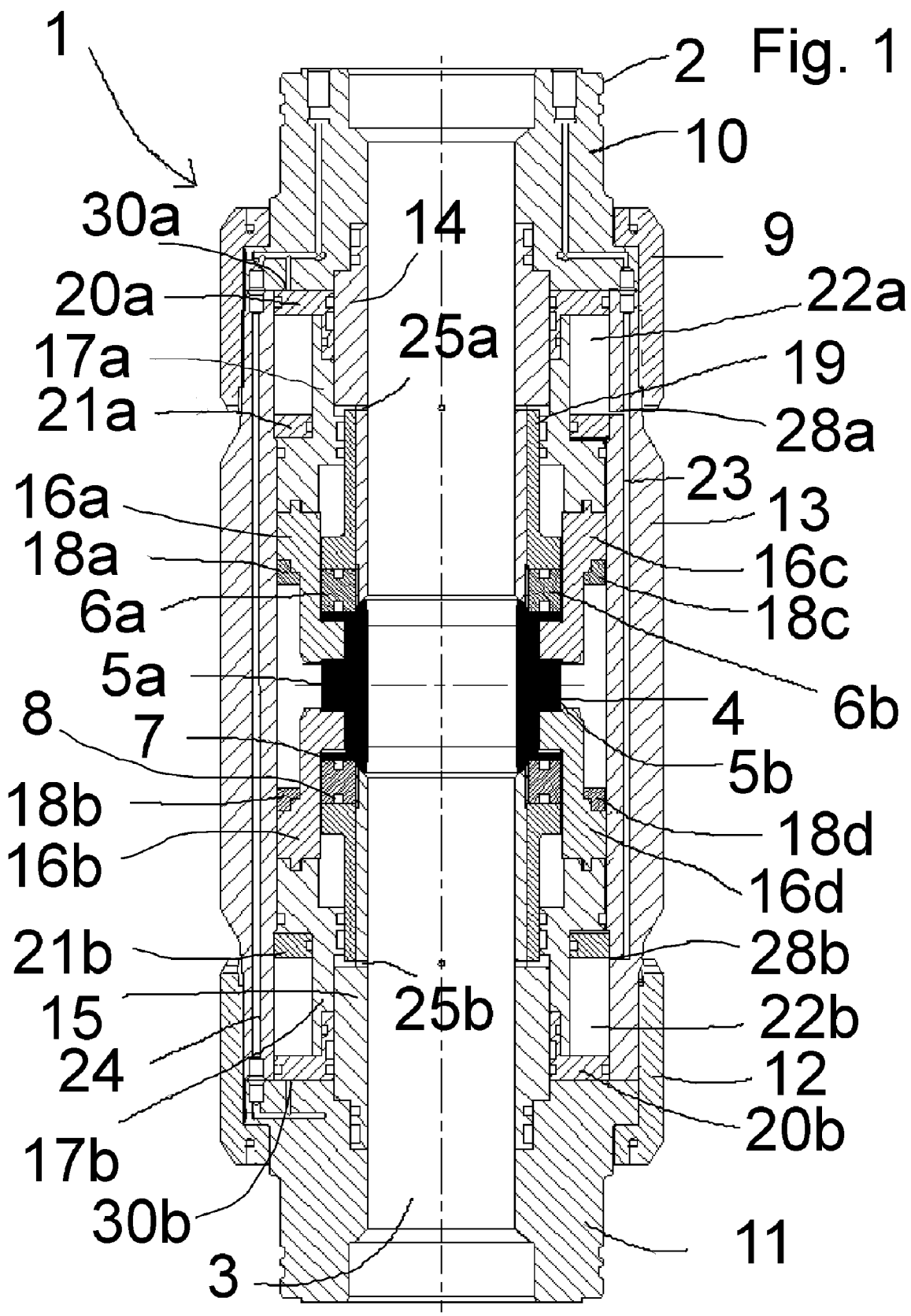
FIG. 1 schematically shows a sectional view of an exemplary valve assembly in accordance with an embodiment of the present invention in an "open" configuration.
Figure 3:
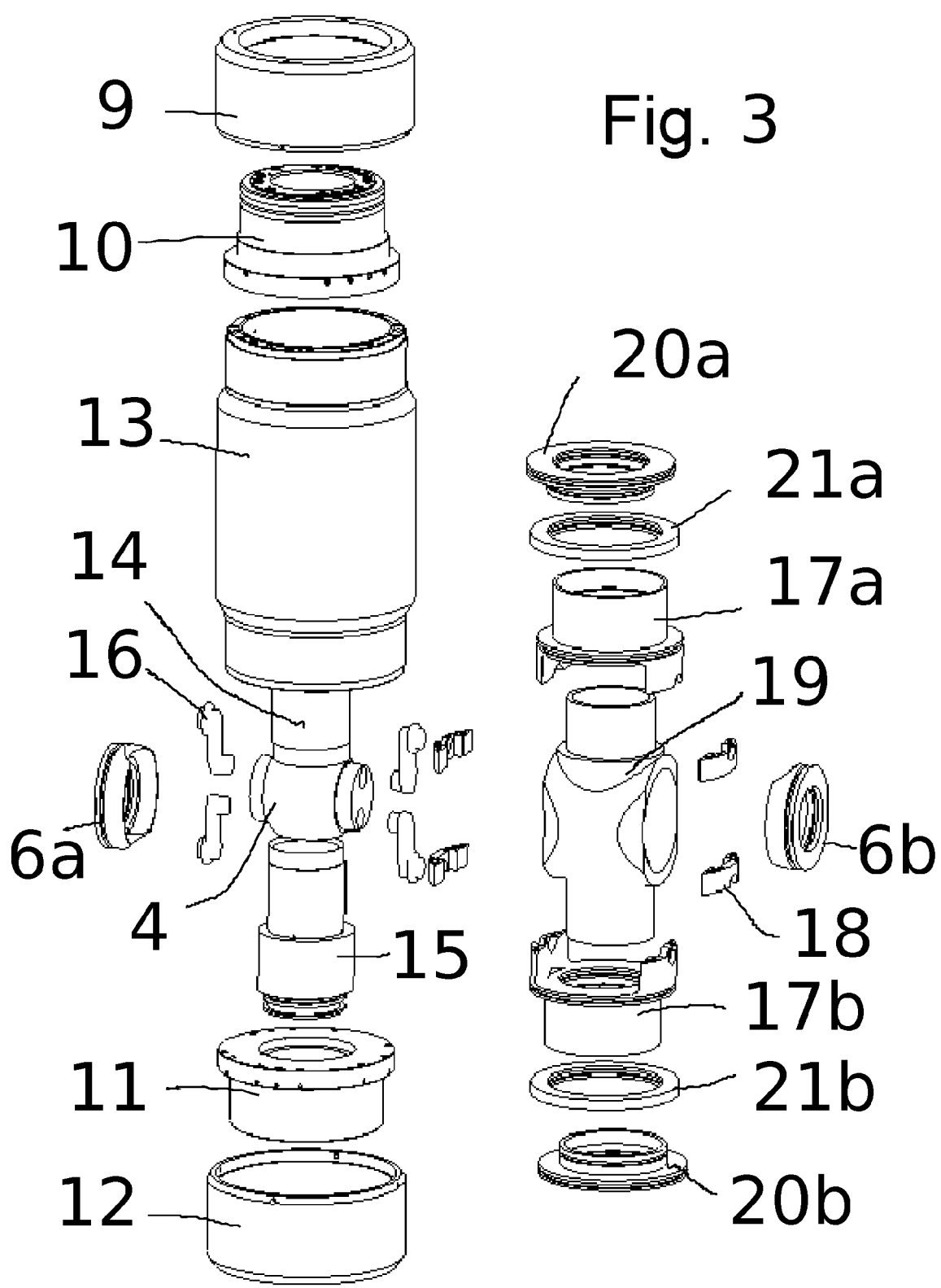
FIG. 3 schematically shows the valve assembly of FIG. 1 in an exploded, perspective view.

A ball valve assembly 1 in accordance with an embodiment of the invention is schematically shown in FIG. 1, and in an "exploded" perspective view in FIG. 3. It can be seen that there is much symmetry between the top and bottom halves of the assembly 1, and so for convenience, components located in the upper half of the assembly as shown in FIG. 1 will generally be denoted "top", while those located in the lower half of the assembly as shown will generally be denoted "bottom".

The assembly 1 is particularly suited for use within a completion safety module (CSM) of an underwater hydrocarbon extraction well facility, which are known components per se. The assembly 1 includes a pipe section 2 with an axial bore 3 running therethrough for enabling fluid flow therethrough. The pipe section 2 includes a top housing 10 and bottom housing 11 at its top and bottom ends, with fittings provided on each housing enabling connection to other components of a fluid transportation system (not shown), in this case components of the CSM, such that in use, production fluid flows through the bore 3.

A valve ball 4 is mounted approximately within the pipe section 2 and for rotation with respect to the pipe section 2, between an open position in which fluid within the bore may flow through an internal conduit of the ball 4 and a closed position in which the conduit is inaccessible to fluid within the bore. In FIG. 1, the valve is shown in an "open" configuration, such that production fluid flow is possible through the conduit. The ball 4 comprises first and second trunnions 5a, 5b, which are mounted within corresponding trunnion plates 6a, 6b. Bearings 7 are provided between each trunnion 5a, 5b and respective plate 6a, 6b, so that the trunnions, and thus the ball, may rotate smoothly within the trunnion plates. The trunnion plates 6a, 6b are in turn mounted to an encapsulation 19, shown most clearly in FIG. 3. The encapsulation 19 is a single-piece, generally cylindrical component with an axial conduit running top to bottom as shown, which is located coaxially to bore 3. The central portion of encapsulation 19 is adapted to receive the valve ball 4, with machined side openings for receiving the trunnion plates 6a, 6b and enabling access to the trunnions 5a, 5b. Seals 8 are provided between each trunnion plate and the encapsulation, running circumferentially around the trunnion plates, to prevent fluid ingress therebetween.

Figure 2:
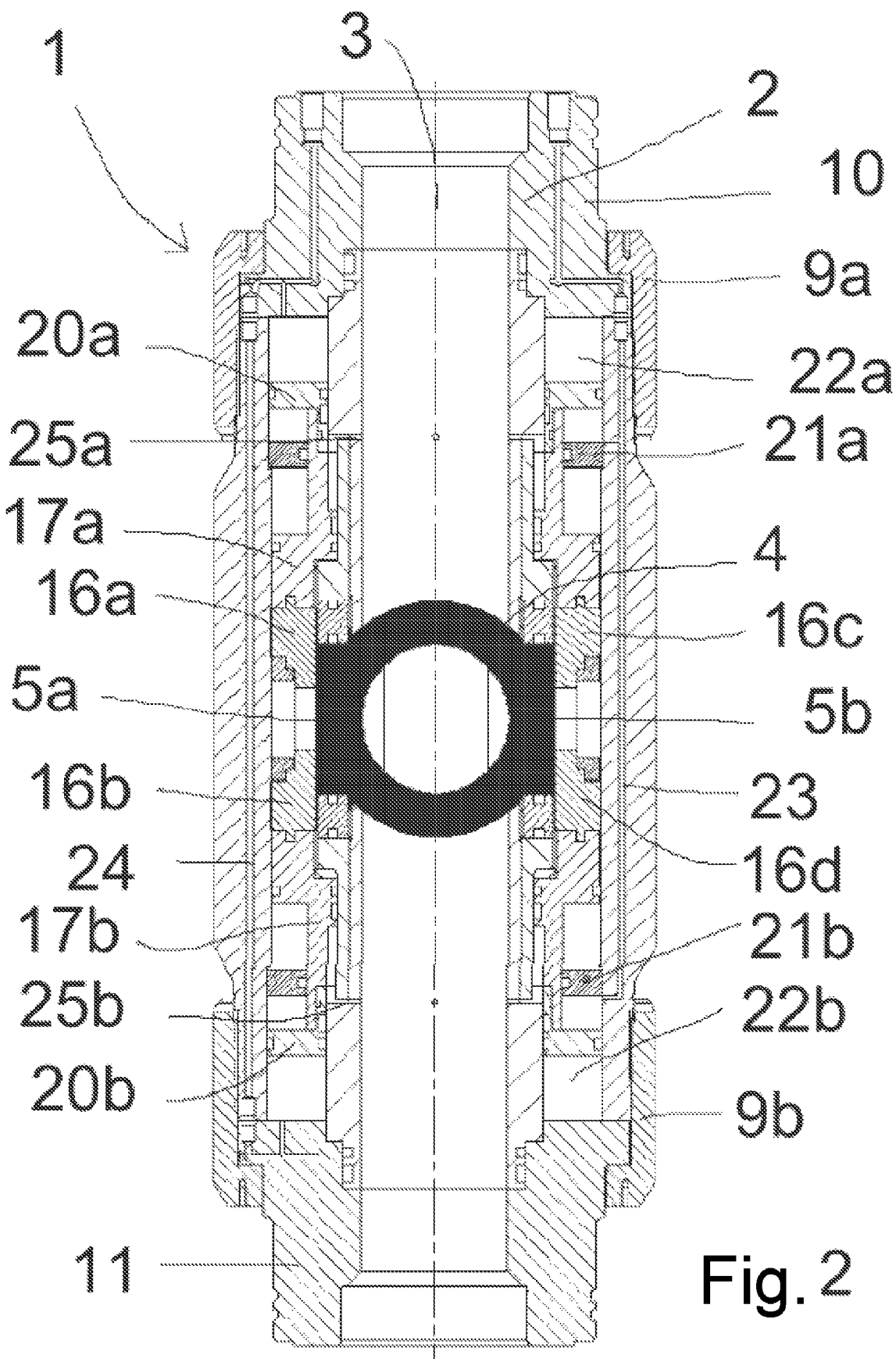
FIG. 2 schematically shows a sectional view of the valve assembly of FIG. 1 in a "closed" configuration.
Figure 4:
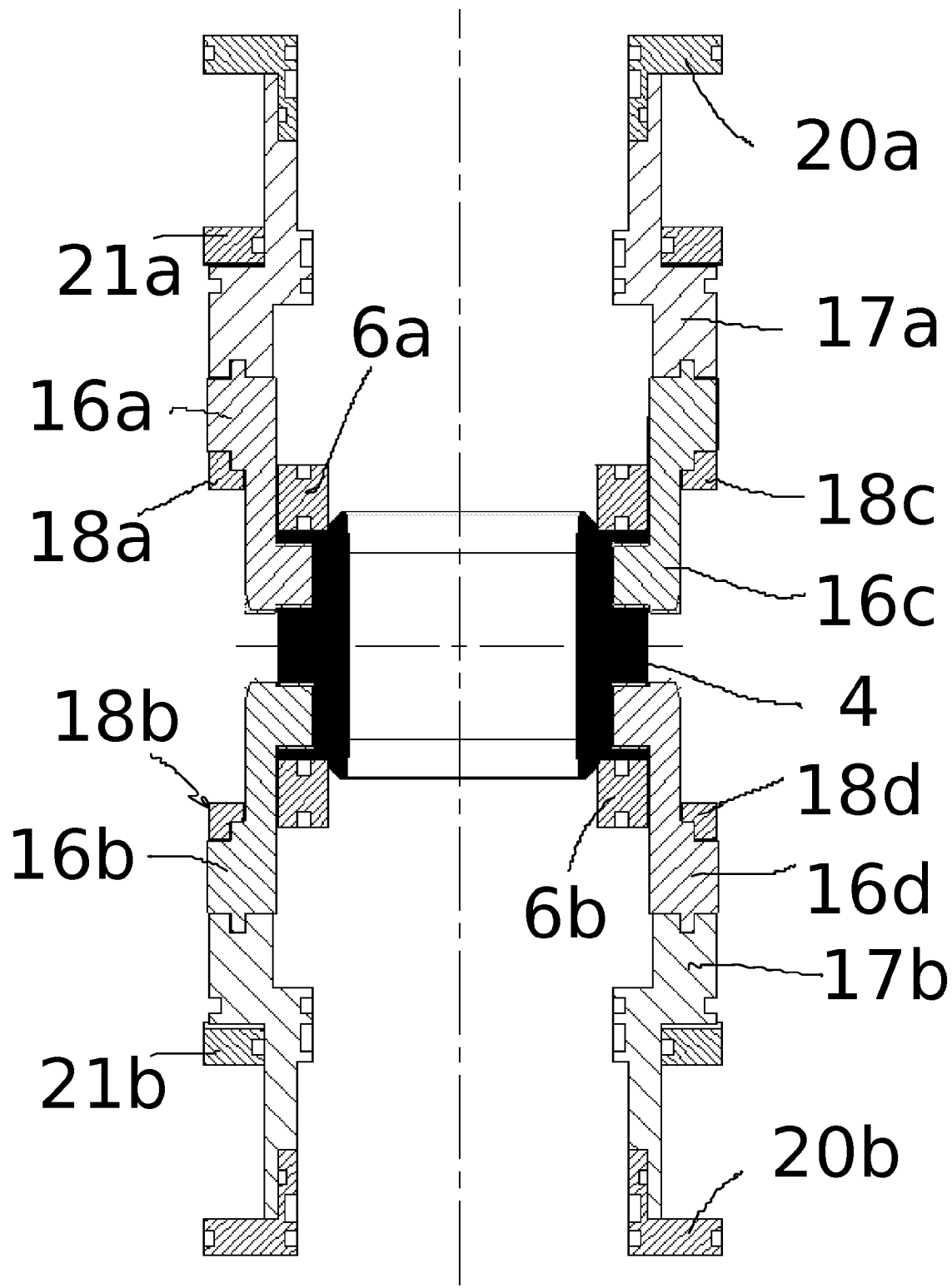
FIG. 4 schematically shows a sectional view of the drive mechanism of the valve assembly of FIG. 1.

Drive means for rotating the valve ball 4 are also provided, these drive means being located radially outside the bore 3. This drive mechanism is shown more clearly in FIG. 4. The drive means include four crank arms 16a-16d, top and bottom annular crossheads 17a, 17b and top and bottom moveable pistons 20a, 20b, to be described in more detail below. The encapsulation 19 has portions, i.e. the top and bottom extremities, which are located radially between the bore 3 and the drive means, such that in use the encapsulation prevents fluid within the bore 3 from accessing the drive means. The encapsulation 19 therefore keeps the drive means free from debris entrained within the production fluid, which is critical for sustained operation. The internal surfaces of the encapsulation 19 are designed to have a relatively wide clearance with the valve ball 4, with no spherical contact, thus reducing the friction caused by solid contamination within the production fluid, and preventing hindrance of the valve ball rotation. The side openings of the encapsulation 19 provide relatively wide support for the ball and good guidance for the ball rotation. Sealing is provided on the encapsulation 19, for example between the encapsulation 19 and crossheads 17a, 17b, to completely seal the formation fluid flow during the closed condition of the valve ball 4 (see FIG. 2).

The valve ball 4 is rotated by four crank arms 16a-16d, rotatably connected at one end thereof to the trunnions 5a, 5b, with two crank arms connected to each trunnion. The other ends of the crank arms are rotatably linked to a top or bottom crosshead 17a, 17b, being loosely constrained between the crosshead and a respective crosshead cover 18a-18d. Each crosshead 17a, 17b is annular, with an opening co-axial to the bore 3. Each crosshead has a shoulder portion of greater diameter at the end nearest the ball, to receive encapsulation 19, and a relatively narrow portion of smaller diameter at the other end. The crossheads 17a, 17b are linearly moveable along the axis of the pipe section 2, such that linear movement of a crosshead translates into rotational movement of valve ball 4. The top and bottom crossheads 17a, 17b are respectively linearly driven by top and bottom moveable pistons 20a, 20b connected to the other ends of the respective crossheads, i.e. the ends furthest from the valve ball 4.

The wall of the bore 3 is defined along much of its length by top and bottom inserts 14, 15. These are substantially cylindrical components with respective narrow portions that are inserted into the encapsulation 19 and extend to the valve ball 4.

Much of the external surface of the pipe section 2 is defined by a generally cylindrical outer body 13, which is located radially outside the drive means, and connected to top housing 10 and bottom housing 11 by a top body nut 9 and bottom body nut 12 respectively.

The outer body 13 carries top and bottom fixed pistons 21a, 21b on its internal surface, at a position adjacent the shoulder portions of respective crossheads 17a, 17b when the valve is open. The fixed pistons 21a, 21b are provided with fluid-tight seals which abut the narrow portion of the respective crosshead. It can be seen that top and bottom piston chambers 22a, 22b are thereby defined by respective fixed pistons 21a, 21b, movable pistons 20a, 20b, crossheads 17a, 17b and outer body 13.

In addition, outer body 13 includes hydraulic fluid lines inside, with an "opening" hydraulic fluid line 23 running generally axially on the right side of the assembly as shown, and a "closing" hydraulic fluid line 24 running generally axially on the left side of the assembly as shown. These hydraulic fluid lines extend through top housing 10 to the tap of the assembly, which enables connection to a remote hydraulic fluid source (not shown). The opening fluid line 23 has top and bottom ports 28a, 28b into respective top and bottom piston chambers 22a, 22b. The closing fluid line 24 meanwhile has top and bottom ports 30a, 30b at the top and bottom housings 10, 11 into respective top and bottom piston chambers 22a and 22b. Barrier sealing on the external sides of crossheads 17a, 17b serves to isolate the hydraulic chambers from the bore fluid.

Top and bottom inserts 14 and 15 include respective top and bottom failsafe fluid paths 25a, 25b joining the bore 3 and the inner surface of respective top and bottom crossheads 17a, 17b.

In operation, to open the valve, hydraulic fluid pressure is applied to opening line 23, and thus to ports 28a, 28b. This increases the fluid pressure in piston chambers 22a, 22b, and causes the moveable pistons 20a, 20b, and hence also the crossheads 17a, 17b, to move outwardly, i.e. away from the valve ball 4. The linear motion of the crossheads 17a, 17b causes the crank arms 16a-d to rotate the valve ball 4 to the open position.

To close the valve, hydraulic pressure is applied to closing line 24, causing fluid to flow to ports 30a, 30b, which impels the moveable pistons 20a, 20b to move toward the valve ball 4. This linear motion causes the crank arms 16a-d to rotate the valve ball 4 into a closed configuration, shown in FIG. 2.

In the event of a loss of hydraulic fluid pressure within chambers 22a, 22b, production fluid may enter failsafe ports 25a, 25b, and force the crossheads 17a, 17b to move linearly towards the valve ball 4, which again causes the valve ball 4 to rotate into the closed configuration. The failsafe actuation path is separated from the hydraulic fluid areas, preventing contamination of the hydraulic fluid.

Figure 5:
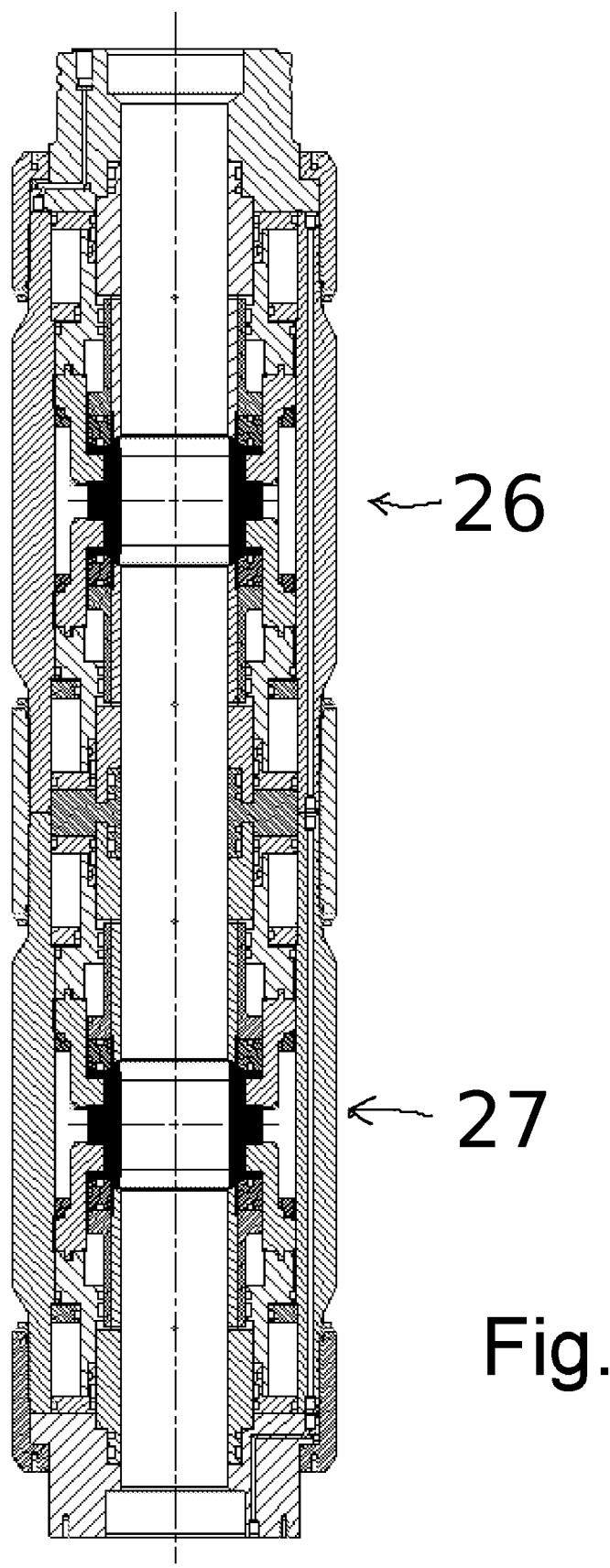
FIG. 5 schematically shows a sectional view of a dual-valve assembly in accordance with an embodiment of the present invention.

The piston chambers 22a, 22b when fed with hydraulic fluid from the opening line 23 acts against the bore pressure (via crossheads 17a, 17b) to open the valve ball 4 by pushing the crossheads away from the ball centreline. The areas of the failsafe paths 25a, 25b and piston chambers 22a, 22b are so adjusted that a lesser hydraulic pressure would open the valve ball 4 against the relatively huge bore pressure. When closing ports 30a, b are fed with hydraulic, fluid from line 24, this, along with the failsafe closing pressure, moves the crossheads 17a, 17b toward the valve ball centreline, hence resulting in closing the ball It can be seen that in order to effect rotation of the ball, application of hydraulic fluid within either of the lines 23 or 24 causes the first and second moveable pistons 20a, 20b (and thus also crossheads 17a, 17b) to linear actuating forces of substantially equal magnitude but opposite direction. This improves valve actuation balance as compared to prior designs In addition, the use of four crank arms 16a-d, connected to the ball, with two cranks arms on each of the left and right sides of the ball provide a uniform balanced force for ball rotation, i.e. there is balanced actuation from crosshead to ball, Another embodiment of the present invention is schematically shown in FIG. 5. Here, the valve assembly includes two valve sub-assemblies 26 and 27. Each sub-assembly is generally similar to that described with reference to the embodiment described above, with the operating functions of the upper and lower ball valve assemblies 26, 27 being independently ported through the outer body. To avoid confusion, FIG. 5 does not show all of the necessary porting, but only shows one hydraulic line running along the right side of the body. In fact, the porting for each sub-assembly 26, 27 would be similar to that of assembly 1 of the embodiment described above, as will be apparent to those skilled in the art.

This type of assembly would be useful in underwater hydrocarbon extraction facilities, with sub-assembly 26 acting as a "seal ball valve" and sub-assembly 27 acting as a "shear ball valve", as would be apparent to those skilled in the art.

Embodiments of the present invention provide a means to prevent contamination of the rotation mechanism by encapsulating the ball valve assembly to prevent contaminant ingress.

Embodiments of the present invention provide balanced force transmission to the ball by using a balanced actuation mechanism to cause ball rotation.

In more detail, embodiments of the present invention provide, inter alia, the following:

Avoidance of Ball Stalling: ball stalling, which is caused by friction due to debris ingress and solidified contamination formed between the narrow clearance of ball and encapsulation, is avoided, as there is no spherical contact between ball and encapsulation. This helps avoiding wear of the ball due to friction, and therefore leads to increased operation life-cycle.

Avoidance of mechanism damage: debris ingress into the actuation zone is avoided by the encapsulation, which reduces the friction in the mechanism. Overloading of the mechanism and resultant deformation is thereby avoided.

Uniform balanced force transmission: a uniform balanced force provided to the ball maintains the stability of the assembly. Deformation of the mechanism due to overloading/unbalanced force is thereby avoided.

Formation fluid: adverse effects of formation fluid in the mechanism zone are avoided by the encapsulation, and advantageously the bore pressure itself is utilized for the fail-safe closing of the ball valve.

Ease of assembly/maintenance: embodiments of the present invention enable the ball valve to be readily constructed, inspected and maintained. In addition, checking of the ball alignment may be performed externally, thus reducing time and cost.

The above-described embodiments are exemplary only, and other possibilities and alternatives within the scope of the invention will be apparent to those skilled in the art. For example, although the invention has been described as being of particular relevance for well completion systems it may be adapted to any application of a ball valve, not necessarily within a subsea environment.

What is claimed is:

1. A ball valve assembly comprising:
a pipe section having an axial bore for enabling fluid flow therethrough in use;
a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore;
a device configured to rotate the valve ball, the device being located radially outside the axial bore;
an encapsulation positioned to receive the valve ball and having portions located radially between the pipe bore and the device configured to rotate the valve ball, such that the encapsulation prevents fluid within the axial bore from accessing the device configured to rotate the valve ball; and
a hydraulic fluid line,
wherein the device comprises a piston actuated by hydraulic fluid pressure within the hydraulic fluid line; and
wherein the pipe section comprises a failsafe fluid path in fluid connection with the bore, such that in the event of a loss of hydraulic fluid pressure within the hydraulic fluid line, fluid flows from the bore through the failsafe fluid path to force one or more crossheads to move towards the valve ball causing the valve ball to rotate into the closed position.

2. The bail valve assembly according to claim 1, wherein the valve ball comprises first and second diametrically opposed trunnions, and the valve ball is mounted via respective trunnion plates, wherein each trunnion plate receives a respective trunnion.

3. The ball valve assembly according to claim 2, wherein the trunnion plates are carried by the encapsulation.

4. The ball valve assembly according to claim 2, wherein seals are provided between each trunnion plate and the encapsulation to prevent fluid flow therethrough.

5. The ball valve assembly according to claim 1, wherein the encapsulation defines a wall of the axial bore.

6. The ball valve assembly according to claim 1, wherein the encapsulation carries an insert, the insert defining a wall of the bore.

7. The ball valve assembly according to claim 1, wherein the device configured to rotate the valve ball comprises a crank attached to the valve ball.

8. An underwater well facility comprising a valve assembly in accordance with claim 1.

9. A ball valve assembly comprising:
a pipe section having an axial bore for enabling fluid flow therethrough in use;
a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore; and
a device configured to rotate the valve ball, the device being located radially outside the axial bore;
wherein the device configured to rotate the valve ball comprises a first piston and a second piston located on opposed sides of the valve ball in the direction a the bore axis, the first piston and second piston being configured to be actuated by a common hydraulic fluid line, such that application of hydraulic fluid pressure at the common hydraulic fluid line causes the first piston and second piston to be subjected to linear actuating forces of substantially equal magnitude in opposite directions; and
wherein the pipe section comprises a failsafe fluid path in fluid connection with the bore, such that in the event of a loss of hydraulic fluid pressure within the common hydraulic fluid line, fluid flows from the bore through the failsafe fluid path to force one or more crossheads to move towards the valve ball causing the valve ball to rotate into the closed position.

10. The ball valve assembly according to claim 9, wherein application of hydraulic fluid pressure at the common fluid line causes the valve ball to rotate to an open position, and wherein a second common hydraulic fluid line is provided, such that applying hydraulic fluid pressure to the second common hydraulic fluid line causes the first piston and second piston to be subjected to linear actuating forces of substantially equal magnitude in opposite directions, causing the valve ball to rotate to a closed position.

11. The ball valve assembly according to claim 9, wherein each piston is connected to the valve ball via a respective crank arm, such that linear motion of the piston causes rotation of the valve ball.

12. The ball valve assembly according to claim 11, wherein each piston is connected to the valve ball via an additional respective crank arm at a diametrically opposite position to the first respective crank arm.

13. The ball valve assembly according to claim 12, wherein the valve ball comprises a first and a second diametrically opposed trunnion, and wherein the crank arms are connected to respective trunnions.

14. An underwater well facility comprising a valve assembly in accordance with claim 9.

15. A ball valve assembly comprising:
a pipe section having an axial bore for enabling fluid flow therethrough in use;
a valve ball having an internal conduit, the valve ball being mounted within the pipe section and being for rotation with respect to the pipe section between an open position in which fluid within the axial bore may flow through the internal conduit and a closed position in which the internal conduit is inaccessible to fluid within the axial bore;
a device configured to rotate the valve ball, the device being located radially outside the axial bore; and
an encapsulation positioned to receive the valve ball and having portions located radially between the pipe bore and the device configured to rotate the valve ball, such that the encapsulation prevents fluid within the axial bore from accessing the device configured to rotate the valve ball;
wherein the device configured to rotate the valve ball comprises a first piston and a second piston located on opposed sides of the valve ball in the direction of the bore axis, the first piston and the second piston being configured to be actuated by a common hydraulic fluid line, such that application of hydraulic fluid pressure at the common hydraulic fluid line causes the first piston and the second piston to be subjected to linear actuating forces of substantially equal magnitude in opposite directions;
wherein the pipe section comprises a failsafe fluid path in fluid connection with the bore, such that in the event of a loss of hydraulic fluid pressure within the common hydraulic fluid line, fluid flows from the bore through the failsafe fluid path to force one or more crossheads to move towards the valve ball causing the valve ball to rotate into the closed position.

16. The ball valve assembly according to claim 15, wherein application of hydraulic, fluid pressure at the common fluid line causes the valve ball to rotate to an open position, and wherein a second common hydraulic fluid line is provided, such that applying hydraulic fluid pressure to the second common hydraulic fluid line causes the first piston and the second piston to be subjected to linear actuating forces of substantially equal magnitude in opposite directions, causing the valve ball to rotate to a closed position.

17. An underwater well facility comprising a valve assembly in accordance with claim 15.

\* \* \* \* \*